Patented Feb. 5, 1952

2,584,839

UNITED STATES PATENT OFFICE 2,584,839

DECREASING FLUORESCENCE OF SYNTHETIC CAFFEINE

Jay S. Buckley, Jr., Groton, Conn., assignor to Chas. Pfizer & Co., Inc., a corporation of Delaware No Drawing. Application December 4, 1950, Serial No. 199,160

4 Claims. (Cl. 260—256)

This invention relates to the preparation of caffeine of improved quality and particularly to non-fluorescent synthetic caffeine.

Caffeine prepared synthetically often has a considerable bluish fluorescence which appears both in the solid compound and in solutions thereof. Natural caffeine possesses a similar fluorescence but to a much more limited degree. The increased fluorescence of the synthetic material is most undesirable, since it is often transmitted to other products in which the caffeine is utilized, to their marked disadvantage.

Various methods known to be useful in removing impurities from other organic compounds have been tried in an attempt to remove the fluorescing contaminants from synthetic caffeine. Aqueous solutions of the material have been treated with activated carbon, but only slight improvement is obtained. The same is true of treatments with alumina and in alumina columns. Some improvement is realized when a chloroform solution of the caffeine is employed instead of an aqueous solution. However, using a large volume of organic solvents is both expensive and inconvenient, and additional operations of extracting the caffeine from the water solution in which it is normally prepared into the solvent and of later recovering the solvent are required. In addition, the usual precautions must be taken which are necessary when working with such organic materials.

It has now been found that when aqueous or organic solvent solutions of crude synthetic caffeine are treated with nitrous acid either per se or through a precursor of nitrous acid and the caffeine then recovered, fluorescence of the product is effectively and most unexpectedly minimized or obviated. Only a small amount of the reagent is required to decrease the fluorescence of synthetic caffeine to a low value comparable at least to that of natural caffeine. Rather than using nitrous acid as the agent we may use suitable precursors of it such as the oxides of nitrogen which are generated by the action of mineral acids (e. g. hydrochloric acid) on metallic nitrites. A further alternative is the use of organic nitrites such as ethyl, butyl, or amyl nitrite. The lower members of this series are gases and may be generated and piped into the reaction mixture. Certain organic liquids, such as chloroform, may be used as the solvent for the caffeine rather than water, and in this case the use of organic nitrites with an organic acid is indicated. However, the use of aqueous solutions is preferred in large scale operation.

In the preferred practice of this invention, a warm or hot aqueous solution of the crude synthetic caffeine, at a pH which is slightly acid or neutral, is treated with a weight of a soluble nitrous acid salt, say an alkali metal nitrite, equal to about 1 to 5 per cent of the weight of caffeine present. Either before, during, or after the nitrite treatment, acid is added to the solution in an amount necessary to free the nitrous acid. For instance, acetic acid or a mineral acid, etc., may be used for this purpose. After stirring for a short time, the mixture is neutralized or made slightly basic and then cooled, directly or after some concentration, to crystallize the purified caffeine. It is best to employ solutions of the caffeine ranging in concentration from about 10 to 25 per cent by weight, and it is generally most economical and convenient to use a concentration of about 20 to 25 per cent. For efficient operation the temperature of the aqueous solution should be such that the caffeine is readily soluble; this may vary from 70° to 100° C., depending upon the concentration used, and the preferred range is 80° to 85 C. Before the solution is cooled to crystallize the caffeine, it may be treated with decolorizing carbon to remove colored impurities; however, this has little effect on the fluorescence of the product. The mother liquor left after removal of a crop of caffeine crystals may be concentrated to recover further material, or it may be extracted with a solvent such as chloroform.

According to one specific embodiment of this invention, synthetically prepared caffeine having an undesirably high fluorescence value is dissolved in hot water at a concentration of 200 to 240 grams (as anhydrous caffeine) per liter. The mixture is heated to 80° to 95° C. and adjusted to pH 6-7. This solution is treated with two to four pounds of commercial sodium or potassium nitrite per one hundred pounds of caffeine in the batch. An aqueous solution of acetic acid stoichiometrically equivalent to the nitrite content is then slowly added to the well-stirred mixture over a period of about fifteen minutes or more, while an elevated temperature is maintained. The pH is then adjusted to 7.8 with a caustic soda solution and the hot material treated with activated carbon and a filteraid. After filtration the clear solution is cooled, and crystallized caffeine of markedly lower fluorescence is obtained.

The recovery of purified caffeine from this treatment is excellent, over 95 per cent yield normally being obtained. The quality of the material is greatly improved. Fluorescence of the various samples of caffeine is measured on solutions thereof by means of a conventional fluophotometer. Natural caffeine generally has a fluorescence value of less than 5 on the arbitrary scale set up for this instrument, and this material is used as a standard for comparing synthetic caffeine samples. Fluorescence values for unpurified synthetic caffeine on this arbitrary scale may range from 10 or so to as high as 180. Crude caffeine with a fluorescence value of about 20 or more is improved by the present process to such an extent as to be at least comparable to natural caffeine, and materials with higher fluorescence ratings are correspondingly purified.

The following examples are given to illustrate this invention:

Example I

Fifty grams of synthetic caffeine with a fluorescence value of 19 on the fluophotometer were dissolved in 250 milliliters of water by heating to 85° C. The solution was vigorously stirred at this temperature and 1.0 gram of sodium nitrite was introduced. One gram of acetic acid in one milliliter of water was added dropwise to the hot solution over a period of fifteen minutes. After stirring for a further fifteen minutes at 85° C., the solution was neutralized with sodium carbonate and then cooled to room temperature. The crystallized caffeine product was filtered and dried. Further product was recovered by extracting the filtrate with chloroform and concentrating under vacuum. A total of 99.4 per cent by weight of the caffeine used as starting material was obtained, and the product had a fluorescence value of only 4 on the arbitrary scale.

When 2.0 grams of sodium nitrite and a correspondingly greater amount of acetic acid were used to treat an additional 50-gram sample of this same batch of caffeine, little material improvement in the fluorescence value was realized and the amount recovered was approximately the same. The melting point of the product was 235° to 237° C.

Example II

Fifty grams of crystalline caffeine with a fluorescence value of 122 were dissolved in 200 milliliters of water at 90° C. One gram of commercial sodium nitrite was added to the hot solution and this was followed by 1.0 milliliter of glacial acetic acid added drop-wise. The hot solution was stirred during the additions and for several minutes thereafter. It was then neutralized with sodium carbonate and treated with a small amount of activated carbon (Nuchar C). The mixture was filtered with the aid of a diatomaceous earth filteraid and the filtrate was cooled to 0° C. The resulting crystalline caffeine was filtered and dried. Its fluorescence value was found to be 16, a substantial improvement over that of the starting material.

Example III

A sample of crude synthetic caffeine weighing 25 grams and having a fluorescence rating of 182 was dissolved in 100 milliliters of water at about 90° C. The stirred solution was treated with 1.0 gram of potassium nitrite and then with dilute hydrochloric acid stoichiometrically equivalent to the nitrite. After stirring the hot solution for several minutes at 90° to 95° C., it was neutralized with sodium carbonate and treated with activated carbon and a filteraid. The mixture was filtered and the filtrate was cooled to 0° C. The crystals which resulted were dried and their fluorescence value found to be 33.

When the amount of potassium nitrite was reduced to 0.3 gram and all other conditions of this experiment were held constant, fluorescence was reduced to 75. It is thus obviously a simple matter for one skilled in the art to determine the optimum quantity of nitrous acid to give the desired reduction in fluorescence of a given sample.

It is obvious that many modifications may be made in this process without exceeding the scope of the present invention, and protection hereof is not to be limited by the above description except insofar as such limitation is contained in the appended claims.

What is claimed is:

1. A process for decreasing the fluorescence of synthetic caffeine which comprises treating a solution of synthetic caffeine with nitrous acid and recovering the purified caffeine from said solution.

2. A process for decreasing the fluorescence of synthetic caffeine which comprises treating an aqueous solution of synthetic caffeine with a water-soluble nitrous acid salt, freeing nitrous acid from said salt by acidifying the solution, and precipitating the purified caffeine.

3. A process for decreasing the fluorescence of synthetic caffeine which comprises dissolving synthetic caffeine in hot water, introducing an alkali metal nitrite to the solution, adding an amount of acid stoichiometrically equivalent to the nitrite content, neutralizing the solution, and crystallizing purified caffeine therefrom.

4. A process for decreasing the fluorescence of synthetic caffeine which comprises dissolving between about 10% and 25% by weight of synthetic caffeine in water maintained at a temperature of substantially 70°–100° C., introducing to the solution from about 1% to about 5% of sodium nitrite by weight of the caffeine content, adding an amount of acetic acid stoichiometrically equivalent to the added nitrite, neutralizing the solution, and cooling the same to crystallize the purified caffeine.

JAY S. BUCKLEY, JR.

No references cited.